Oct. 26, 1943.  D. SILVERMAN  2,332,873
DIFFERENTIAL RADIOACTIVITY LOGGING
Filed April 25, 1942  2 Sheets-Sheet 1
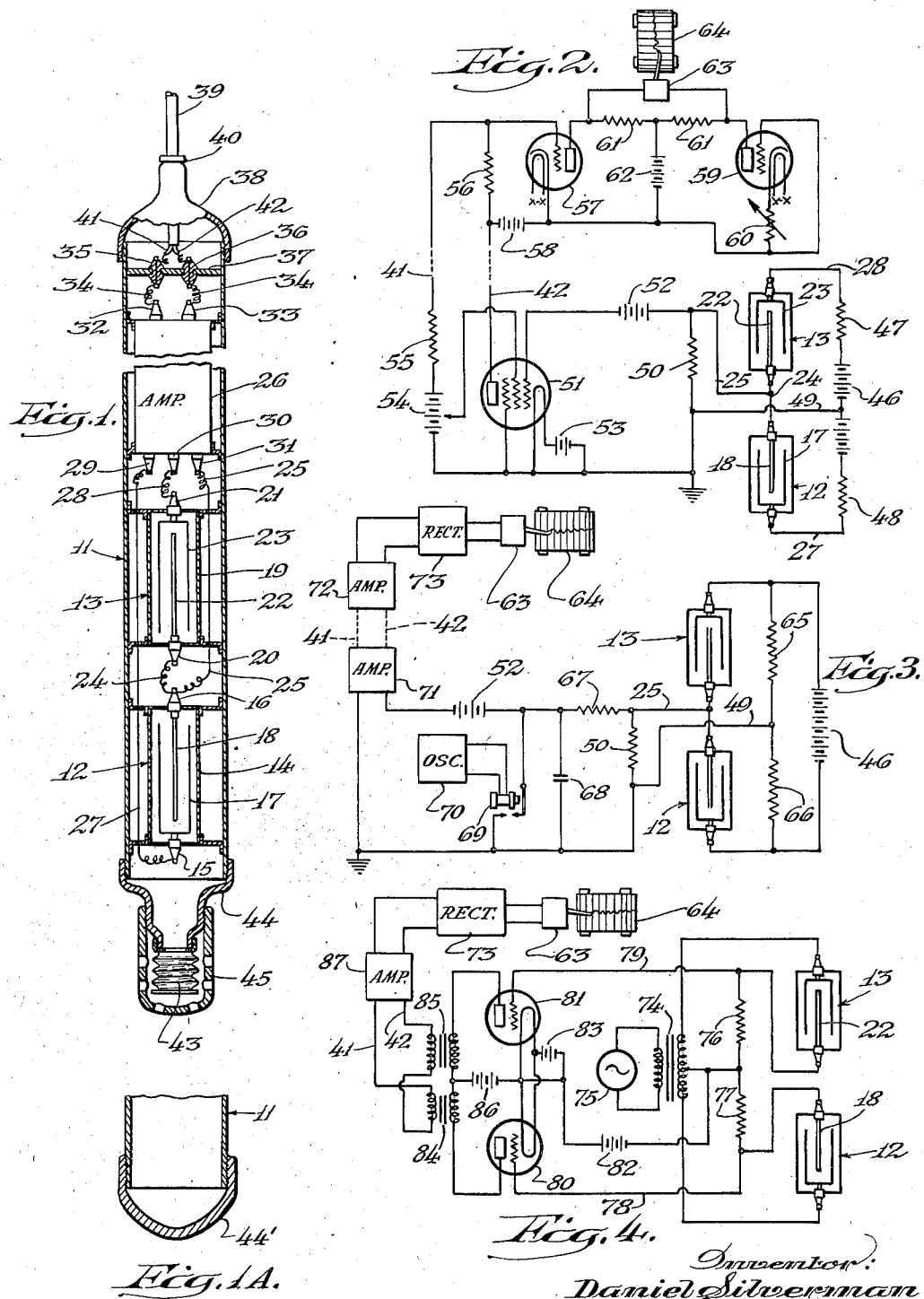

Oct. 26, 1943.                D. SILVERMAN                2,332,873
                    DIFFERENTIAL RADIOACTIVITY LOGGING
                Filed April 25, 1942         2 Sheets-Sheet 2
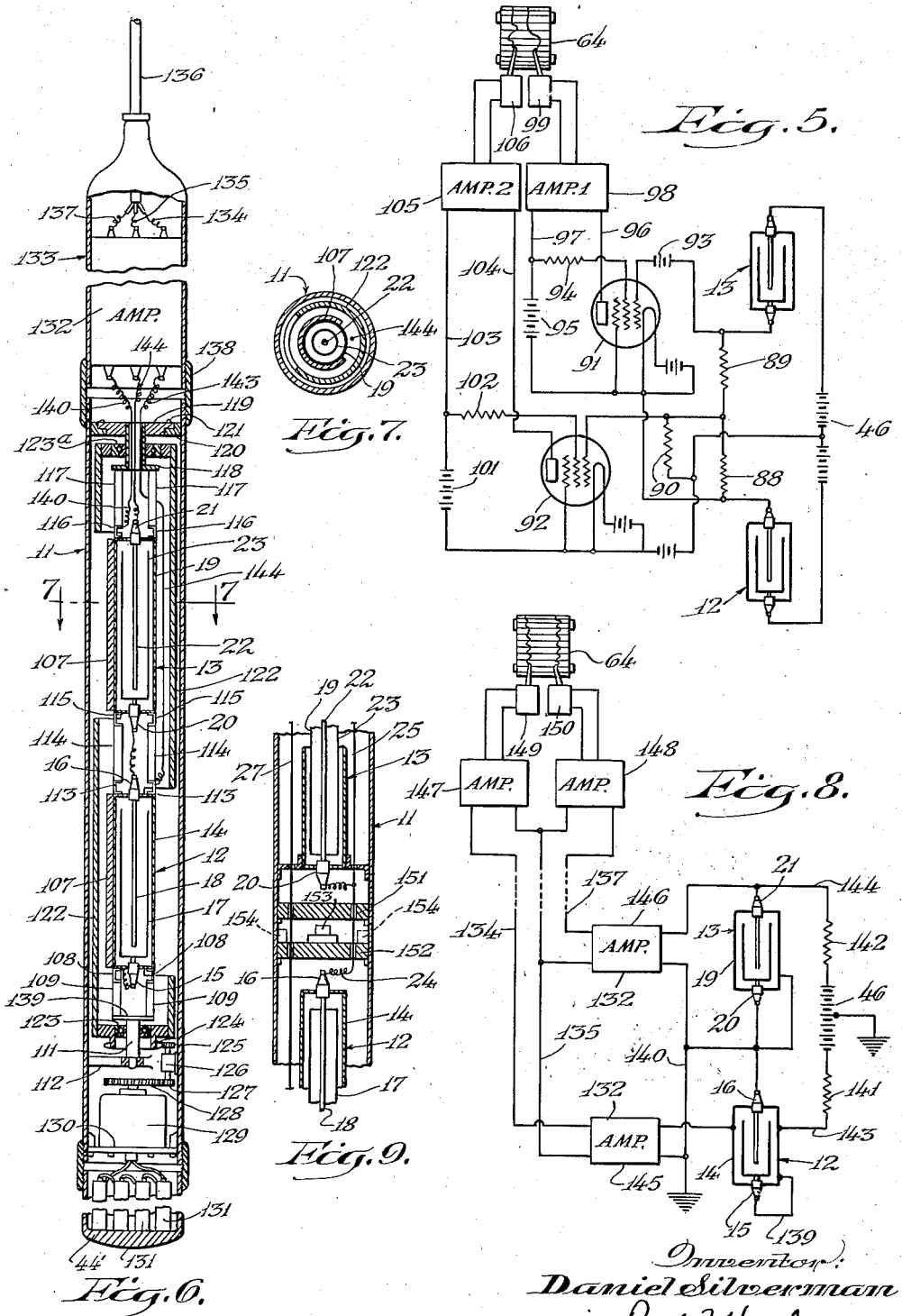
Inventor:
Daniel Silverman
By Paul F Hawley
Patent Agent Patented Oct. 26, 1943

2,332,873

UNITED STATES PATENT OFFICE 2,332,873

DIFFERENTIAL RADIOACTIVITY LOGGING

Daniel Silverman, Tulsa, Okla., assignor to Stanolind Oil and Gas Company, Tulsa, Okla., a corporation of Delaware Application April 25, 1942, Serial No. 440,459

2 Claims. (Cl. 250—83.6)

This invention pertains to the art of well logging and more particularly to a method and means for determining the location of formations in a well by analysis of the radioactivity of these formations. It is equally operable whether the radiation which is measured is spontaneous or whether it is due to secondary radiation caused by impingement upon the geological formation of a primary source of radiation carried with the apparatus.

The principle upon which the system operates involves the measurement of the differential radiation at two zones separated by a fixed distance as the location of these zones relative to the formations in a well is varied. A characteristic variation of the difference in radiation at the two zones is obtained as the zones are moved past a boundary between two beds of differing radioactivity. The preferable arrangement involves the placement of all of the radiation measuring apparatus in a single case adapted to be lowered into a well by means of a cable carrying conducting wires which serve as the transmission medium between the radiation measuring zones and the surface of the earth where the information is recorded. Alternatively the radiation measuring apparatus may be located in a drill collar in a drill string, the information being transmitted to the surface over a cable at the lower end of which is a coupling apparatus by means of which the response of the radiation measuring apparatus can be picked up and recorded at the surface.

It is an object of this invention to measure the difference in radioactivity, either natural or induced, radiated from two different zones a relatively fixed distance apart as the location of the zones is varied. Another object of this invention is to detect the boundaries of radioactive formations accurately by means of a differential radiometer which can be lowered into a well penetrating such formations. It is a further object of this invention to provide a method and apparatus for determining simultaneously the sum and difference of the radioactivity at two different zones in a well where such zones are separated by a fixed distance and wherein said zones vary in elevation. An important object of the invention is the elimination in radioactivity logging of the effects of penetrating radiation coming from regions other than that being logged, thus eliminating such effects as that of cosmic radiation and that of a highly radioactive formation some distance in the well from the section being logged. It is also an object of this invention to provide a means for detecting boundaries between regions in which the type of radiation or wave lengths of radiation vary as well as those in which the radiation are of the same type or the same wave length, but in which the intensities are different. It is a particular object of this invention to provide apparatus by means of which the radiation from radioactive formations can be determined at two points alternatively and by means of which an indication of the radiation of either zone can be determined at a considerable distance from the apparatus. Further objects and advantages of this invention will be apparent from this specification.

In the appended drawings various embodiments of this invention are shown illustrating its application under various conditions. These drawings are for the purpose of illustration only and the invention is not limited solely to the employment of the apparatus and method disclosed by these drawings. In these drawings:

Figure 1 is a view chiefly in cross-section of one type of differential radiometer adapted to be lowered into a well;

Figure 1A is a cross-section of an alternate form of bottom closure for the apparatus shown in Figure 1;

Figure 2 is a schematic wiring diagram of the apparatus used in this differential radiometer and at the surface of the ground in order to measure the differential radiation;

Figure 3 is a schematic wiring diagram of an alternative system of connecting the radiation detecting device shown in Figure 1;

Figure 4 is a wiring diagram of another embodiment of this invention in which the signals proportional to the differential radiation are transmitted to the surface in the form of periodic electric waves;

Figure 5 is a schematic wiring diagram of another embodiment of the invention in which both the sum and the difference of the radiations from two zones separated by a fixed distance is measured simultaneously;

Figure 6 is a view largely in cross section of a well logging apparatus in which the radiation from the two zones is measured alternatively;

Figure 7 is a cross section across the plane 7—7 of Figure 6;

Figure 8 is a schematic wiring diagram of apparatus shown in Figures 6 and 7; and Figure 9 is a cross section of a portion of the apparatus shown in Figure 6 illustrating a further modification of my invention.

In Figure 1 I have shown a differential radiometer mounted in a water tight case 11 and adapted to be lowered by a cable 39 into a well for the purpose of logging the well. In the lower portion of this casing 11 are two ionization chambers 12 and 13. These are arranged by suitable clamps to be easily removable from the casing and to be held rigidly in position at all other times. The ionization chamber 12 preferably includes a metal case 14, at each end of which is mounted a very good insulating bushing 15 and 16 by means of which the electrodes 17 and 18 are held in place. According to one method of construction, the cases of the ionization chambers may be made of substantial welded steel construction and the bushings 15 and 16 can be spark plugs which are suitably fastened in the ends of the cases. Spark plugs are ideal for this application, since they provide very high leakage resistance and are able to withstand very considerable pressures without gas leakage.

Inside ionization chamber 12 are the two electrodes, a central rod 18 supported by the spark plug 16 and a corresponding cylindrical shell 17 supported by the other bushing or spark plug 15. A high difference of potential is maintained between these two electrodes so that any electrons formed by ionization of the gas within the chamber 12 due to the passage of penetrating radiation are attracted to the positive electrode and during their passage excite molecules of gas to a stage of ionization and, consequently, cause the passage of a considerable quantity of current.

The interior of each ionization chamber case is filled with an inert gas such as nitrogen, at a pressure of the order of 100 to 1000 pounds per square inch, for example 300 pounds per square inch.

The upper ionization chamber 13 is similar to the lower one and in turn consists of a metal case 19 bearing bushings 20 and 21, which support the two electrodes 22 and 23. This ionization chamber is likewise filled with an inert gas at approximately the same pressure as that involved in the lower ionization chamber 12. A short insulated conductor 24 connects terminals appearing at the ends of the bushings 16 and 20, and a further insulated lead 25 connects conductor 24 with the amplifier in box 26. Similar leads 27 and 28 extend from electrodes 17 and 23, respectively, to corresponding insulated leads on the amplifier box. Amplifier box 26 consists of a substantial steel chamber similar to the construction of the ionization chamber, utilizing as before spark plugs 29, 30 and 31 as insulating lead-ins capable of withstanding high hydrostatic pressure.

Two other spark plugs 32 and 33 the conductors of which are connected across the amplifier output are connected by insulated leads 34 to the conductors of pressure bushings 35 and 36 sealed through the top plate 37. The casing is surmounted by a cap 38. The electrical cable 39 passes through the stuffing box 40 in this cap 38. Insulated leads 41 and 42 of the electrical cable 39 are connected to the conductors in the pressure bushings 35 and 36.

In the preferred form of construction, the casing 11 is filled with an insulating fluid such as oil, up to the plate 37, and a pressure compensation device, such as the flexible bellows 43 is mounted on the bottom cap 44, so that pressure external to the case is communicated to the oil in the case to maintain substantially well fluid pressure within the case. This prevents leakage of well fluid into the case. A perforated bellows protector 45 is screwed to the cap 44. Alternatively the bottom of case 11 can be closed, as shown in Figure 1A, by a bull plug 44' if the entire case is carefully made water-tight.

The wiring diagram of the apparatus used in Figure 1, as well as the equipment used at the surface is shown in Figure 2. A high potential which may be, for example, of the order of 200 to 1000 volts, is applied by a battery or other source of direct potential 46 to the two ionization chambers 12 and 13 through resistances 47 and 48 and the leads 27 and 28. A lead 49 is brought out from approximately the center point of the battery 46 and grounded.

Each ionization chamber has in effect a very high resistance, the magnitude of which depends upon the ionization of the superatmospheric inert gas contained inside the case. There is no conduction when there is no ionization of this gas. However, when high energy radiation (penetrating radiation, such as gamma radiation) from a radioactive source enters the ionization chamber the molecules of the gas are ionized and due to the electric field present a current will flow between the case and the central electrode, the magnitude of which chiefly depends upon the amount of the ionizing radiation. Since the voltage drop across the chamber varies approximately inversely with the current flow, it is apparent that the drop of potential across the chamber decreases as the ionizing radiation increases. The resistances 47 and 48 are chosen in magnitude such that with relatively negligible ionization in both chambers the lead 25 between the chambers is at the same potential as the center tap 49 on battery 46. For this condition it is apparent that there is no potential between the leads 25 and 49. Likewise if there is an equal amount of radiation entering each chamber the potential drops across them will be approximately equal and there will still be no difference of potential between these two leads. However, as soon as there is a difference in penetrating radiation entering one chamber relative to the other, there is a difference of potential across these leads which will be either positive or negative selectively depending upon which ionization chamber is exposed to the greater radiation.

A high resistance 50 is connected across leads 25 and 49. This may, for example, be of the order of 5 to $20 \times 10^{10}$ ohms. The potential drop across this resistance is amplified and transmitted to the surface of the ground for recording. As shown in Figure 1, a first amplifier in case 26 is used to increase the magnitude of this potential drop for more convenient transmission. One such amplifier is shown in Figure 2. The drop across resistance 50 is applied between the cathode and control grid of a pentode 51 which may be an electrometer tube (such as the FP–54) or which may be a more conventional pentode chosen from a group having extremely high resistance between cathode and control grid. Biased potential for the grid of this tube is obtained from a biasing battery 52, and cathode potential from a battery 53. The pentode shown in Figure 2 is arranged with the suppressor grid connected to the cathode and with a screen grid connected to a tap on the plate battery 54. A lead from the positive terminal of this plate battery is connected through plate resistance 55 to the conductor 41 of a cable 39. The plate of the vacuum tube 51 is connected to the surface through a second lead 42 of this cable. It is apparent that the current flowing through the leads 41 and 42 is directly proportional to the difference in ionization in the two ionization chambers 12 and 13. Therefore, this current is proportional to the differential radiation from the zones in which these radiation chambers are placed. At the surface of the ground, the cable 39 containing the conductors 41 and 42 is wound about a reel such as is used in the conventional well logging practice in such a manner that the upper ends of the conductors 41 and 42 are brought out to slip rings from which the current flowing in the circuit is transferred through brushes to the recording units. This apparatus is illustrated, for example, in Figure 2 of U. S. Patent 2,206,892. In the recording unit shown herein in Figure 2, the current flowing through leads 41 and 42 passes through a grid resistance 56. The difference of potential resulting is impressed between the grid and cathode or a vacuum tube 57 which, as shown, is of the indirectly heated cathode type. A suitable filament potential is applied across the terminals x—x. Grid bias is obtained from a bias battery 58. This vacuum tube 57 in connection with a second vacuum tube 59 serves as a vacuum tube voltmeter, producing a current proportional to the voltage drop across resistance 56. The second vacuum tube 59 preferably has characteristics approximately identical with that of tube 57 and, as shown, is connected with the grid grounded and a variable resistance 60 between the cathode and this ground. The plates of the two tubes are connected through identical resistances 61 to a plate battery 62. The drop from plate to plate of the two tubes is balanced at zero signal across resistance 56 by adjusting the resistance 60. Thereafter the drop from plate to plate depends only upon the magnitude of the voltage drop across resistance 56. A recording milliammeter or galvanometer 63 is connected across the plates of vacuum tubes 57 and 59. The current flowing through this recording meter is therefore proportional to the drop of potential across resistance 56 and consequently is proportional to the difference in penetrating radiation in the two ionization chambers.

Any sensitive type of recording milliammeter can be used or, if it is desired, a recording potentiometer such as the Leeds-Northrup Micromax. The recording arm of this meter is used to trace the record of the differential radiation on a chart 64 which is drawn past the recorder at a rate proportional to the rate of lowering the differential radiometer in the well. As this particular step has been fully described in the prior art and is well known, no further description here is deemed necessary.

In Figure 3 a variant of the circuit diagram shown in Figure 2 is illustrated. In this particular circuit diagram the center point 49 between the two halves of battery 46 is eliminated and instead two equal resistances 65 and 66 are connected across the battery 46 with the center point between them being connected to lead 49. With this arrangement the potential on conductor 49 in Figure 3 is the same as that on conductor 49 in Figure 2. From inspection of the apparatus arrangement in Figure 3 it is seen that the two resistances 65 and 66 and the two ionization chambers 12 and 13 are connected analogous to a Wheatstone bridge so that any change in the resistances of either ionization chamber due to a change in the amount of penetrating radiation impinging on the chamber will appear as a voltage difference across resistance 50, in proportion to the difference in the radiation between the ionization chambers, and with a polarity which reverses when the relative difference in ionization reverses. The voltage across resistance 50 due to the difference in ionization is impressed across resistance 67 and condenser 68. The condenser 68 is periodically discharged through the switch contacts of relay 69, which relay is periodically actuated by a conventional low-frequency oscillator 70. The condenser is discharged at substantially equal intervals of time of duration permitting condenser 68 to recharge between discharges. The fluctuating voltage across condenser 68 is applied in series with the bias potential of battery 52 across the grid and cathode of the first amplifying tube of an amplifier 71. The pulsating output of amplifier 71 is impressed across the conductors 41 and 42 of the cable 39 by which it is transmitted to the surface. There the signal is amplified by an amplifier 72, rectified by a rectifier 73, and the direct current rectified signal recorded by recording milliammeter 63 on chart 64, as previously described.

With either of the types of instruments shown in Figure 2 or 3, the indication produced on the chart 64 varies in magnitude with the degree of difference in intensity of the radiation at the two chambers and is of a polarity which indicates whether the top or bottom chamber is subjected to the greater radiation. From point to point it is apparent, therefore, that the differential radiometer measures the change in radiation as a function of depth and can be said to measure the gradient of the radiation. This last fact is of definite importance. It is found in practice that the radioactive content of various formations or the radioactive response to a primary source of radiation carried along with the instrument may not vary abruptly as the character of the bed changes but may vary relatively smoothly through a transition region. That this should be so is apparent from the manner in which the beds were originally laid down. There was usually no sudden abrupt deposition of sediments or sands. Rather there was a gradual change from one type to another as, for example, from a silt to a sand.

Accordingly, therefore, it is often difficult to define the boundaries between beds by use of the penetrating radiation (usually gamma radiation) in as accurate a manner as is desirable. With the equipment shown here, it is apparent that the maximum reading is obtained for a maximum unbalance, that, therefore, as long as the two ionization chambers are in the same bed, the reading is zero but that a maximum and characteristic pattern is produced as the ionization chambers pass through the region of change from one bed to another. It is also apparent that it is possible to tell from the reading of this instrument whether one is passing from a bed of low radiation to a bed of high radiation or vice versa.

Another definite advantage to the system described herein arises in the fact that quite often the investigation is in a shallow portion of the well and it is customary to case this portion before any investigation of the bed is carried out. Accordingly the only possibility of detecting the differences in beds behind this casing arose from the use of gamma ray well logging since gamma radiation will penetrate a considerable thickness of casing. However, in work at such regions, readings are almost impossible to obtain because of the cosmic radiation which increases the ionization to such an extent that the radiation from the formations is only of secondary importance. With the differential radiometer shown the cosmic radiation influences both ionization chambers so that the effects of cosmic radiation practically balance out, thus permitting accurate delineation of the beds in this shallow section of the well without the difficulty experienced in the prior art. The same is true with respect to the logging near a highly radioactive bed, whereas with the prior types of radiation logging devices the radiation from such a bed masks the effects from the less radioactive beds. Also, while the total radiation from a bed may be constant, it may be so in spite of the fact that the radioactivity of the formation may vary in type and in energy throughout the bed. This fact can not be detected by present instruments, but with this differential radiometer it is possible to make each unit most sensitive to a different energy of radiation (such as varying the relative thickness of cases 14 and 19 or varying the gas pressures in the chambers 12 and 13). Such changes may affect the sensitivity as a whole which can be compensated by a change in gain. Thus variations in type of penetrating radiation, or in intensity will be detected as this instrument is moved along the bore.

For example, if case 19 is thicker than case 14, the upper chamber 13 is affected only by relatively highly penetrating or high energy radiation, while chamber 13 is affected by lower energy radiation as well. In this case, the change in reading on the chart 64 indicates the difference between the penetrating radiation entering chamber 12 and the higher energy portion of that radiation that can enter chamber 13.

In Figure 4 the two ionization chambers 12 and 13 are energized through a step-up transformer 74 which in turn is operated from a very low frequency alternating current generator 75. This frequency can be of the order of 0.1 cycle per second. The center tap of the secondary of the transformer 74 is connected to the midpoint from two resistances 76 and 77 which are connected between the electrode 18 of chamber 12 and the electrode 23 of chamber 13. These electrodes are connected by leads 78 and 79 to the grids of two amplifying tubes 80 and 81. The center point between resistances 76 and 77 is connected through a grid bias battery 82 to the cathodes of tubes 80 and 81 which are supplied with cathode potential through battery 83. The outputs from the plates of these two tubes are connected to the primaries of transformers 84 and 85, the other sides of which are connected to the positive side of the plate battery 86. The secondaries of the two transformers 84 and 85 are connected in series opposition to the two conductors 41 and 42 of the logging cable. At the surface a suitable alternating current amplifier 87 amplifies the output from the transformers 84 and 85. The output from this amplifier 87 passes through a rectifier 73 which in turn energizes a recording milliammeter or the like 63 causing it to form a record on the chart 64 which, as in Figure 2, is preferably actuated in direct relationship to the depth of the differential radiometer in the well.

The operation of this circuit is as follows: Due to the ionization in each chamber, currents flow through resistances 76 and 77 back to the transformer 74. The voltage drop across each of these two resistances 76 and 77 is, therefore, proportional to the ionization in that chamber. This voltage is amplified by the vacuum tubes 80 and 81 and impressed on the primaries of transformers 84 and 85. The secondaries of these transformers are in series opposition so that if the output of the ionization chambers is the same, substantially no potential is applied between leads 41 and 42. On the other hand, when one ionization chamber is activated and the other is not, there is a maximum output across leads 41 and 42. Therefore, the output from the amplifier 87 is proportional to the differential ionization. It follows that the rectified output applied to the recording milliammeter 63 likewise is an indication of the differential ionization at the two chambers.

I have found that often it is desirable to record simultaneously not only the difference between the ionization at the two zones, i. e. the gradient of the ionization, but also the actual ionization at the zones. This can be accomplished satisfactorily by means of the circuit shown in Figure 5. In this case the battery 46 is connected across the two ionization chambers (which are in series) through the resistances 88 and 89. Consequently the voltage drop from the top of resistance 89 to the bottom of resistance 88 measures the total output from the tubes. It is to be noted that a resistance 90 connects the center tap of resistance 88 and 89 with the center point of battery 46 so that a differential current flows through this resistance 90 proportional to the difference in intensity of the current flowing through the two tubes. The potential drop across the two resistances 88 and 89 is amplified by a vacuum tube 91 while the potential across resistance 90, which is proportional to the differential output of the two ionization chambers, is amplified by vacuum tube 92.

The voltage drop across resistances 88 and 89 is applied between the cathode and control grid of vacuum tube 91 together with the bias of battery 93. The screen grid of this tube is connected through a dropping resistance 94 to the plate battery 95. The output from the vacuum tube 91 is impressed across leads 96 and 97 which at the surface are connected to a direct current amplifier 98, the amplified output of which actuated a recording galvanometer 99 causing a first record to be drawn on chart 64. The potential across resistance 90 is similarly applied between control grid and cathode of vacuum tube 92 together with the bias of battery 100. The screen grid is connected to the plate battery 101 through the dropping resistance 102. The output of the plate of this tube 92 is applied between conductors 103 and 104 which are connected at the surface to a second direct current amplifier 105 for further amplification. The output of this amplifier 105 is impressed across a second recording galvanometer 106 which produces a record of the differential ionization on chart 64.

The records made on chart 64 are particularly advantageous in that both the combined ionization and the difference in ionization at the two zones are simultaneously recorded so that not only the boundary between the zones but also the total penetrating radiation can be compared without the difficulty of using two separate charts which might be made at slightly different chart speeds, rendering correlation a difficult task.

In Figures 6 and 7 another embodiment of the invention is shown in which the differential ionization acting on the two ionization chambers is measured by alternate measurements of the ionization at each chamber. The case of each ionization chamber is shielded by a heavy metal shield 107 made of lead or a similar material which is cut away on one side, as shown in the cross section in Figure 7. This shield is sufficient to eliminate all but a negligible amount of the penetrating radiation normally entering the ionization chamber except at the region at which it is cut away. The two ionization chambers 12 and 13 are mounted so that the openings in the shield are aligned as shown in Figure 6. The case 14 of the lower ionization chamber 12 is welded to two brackets 108 which are attached on insulating rods 109 which may be of amber, fused quartz, or the like. At the lower end, each rod 109 is mounted on the plate 110 which in turn is firmly attached to a rod 111. The lower end of this rod 111 is machined to fit in the center opening of a mounting spider 112 welded to case 11.

At the upper end of the case 14 two other brackets 113 are welded. Each is attached to an insulating rod 114 similar to rods 109. The upper end of each rod 114 is attached to a bracket 115 welded to the case 19 of the upper ionization chamber 13. Case 19 likewise bears two welded brackets 116 at the top, each attached to an insulating rod 117 similar to the rods 109. The top of these rods 117 are mounted on a flange of member 118 which is hollow. The top of this member is firmly attached to a plate 119 which is machined to fit in a mounting ring 120 and is attached thereto by screws 121. A cylindrical screen 122 preferably of the same thickness and material as that of the shield 107 is constructed of tubular material with two "windows" cut in it on opposite sides, as shown in Figure 6, so that as this shield is rotated the openings in the screen 122 will alternately come opposite the non-shielded portion of the ionization chambers 12 and 13. As a result first one and then the other ionization chamber is exposed to the radiation in the well as the screen 122 rotates. The screen 122 is rotatably mounted about the member 111 by a bearing 123. A ring gear 124 is mounted on the lower end of the shield cooperating with the pinion 125 attached to the shaft rotating in housing 126. A second pinion 127 is mounted on the other end of this shaft and is rotated by a gear 128 attached to the shaft of an electric motor 129. This motor is mounted on plate 130 attached to supports welded to the casing 11. A number of batteries 131 are connected together as the source of energy for the motor 129. These batteries are mounted in the cap 44' in the lowermost portion of the apparatus, as shown in Figure 6. The upper end of the screen 122 is similarly mounted in bearings 131 which in turn is mounted on member 118 supporting the upper end of the ionization chamber combination. The amplifier 132 mounted in another section 133 of the apparatus, consists of two amplifying sections, each of the type shown, for example, in Figure 2 and each adapted to amplify the output from only one ionization chamber. The input to one amplifying section is connected responsively to chamber 12 and the input to the other amplifying section is connected responsively to chamber 13 as described in connection with Figure 8. The output from one amplifier is impressed across two conductors 134 and 135 of a three conductor cable 136 by means of which the amplified output of that ionization chamber is transmitted to the surface. There it passes into one amplifier of a double amplifier system such as amplifier 98 in Figure 5 and the output is recorded as shown in that figure. The output of the second amplifier section in amplifier 132 is connected at its output to leads 135 and 137 of the three conductor cable 136 and at the surface the output is amplified by an amplifier such as shown at 105 in Figure 5, and the output recorded accordingly. Section 133 and case 11 are connected by a coupling 138 which has both a right and a left-hand screw so that these sections can be joined with relatively little rotation.

In Figure 8 the wiring diagram of the apparatus of Figure 6 is given. The lead from spark plug 15 is grounded to case 14 of chamber 12 by lead 139. The leads from spark plugs 16 and 20 are connected together and grounded by lead 140. The battery 46, the midtap of which is also grounded, is connected through dropping resistors 141 and 142 to the spark plugs 15 and 28 by leads 143 and 144 respectively. One of the amplifying sections 145 in amplifier 132 is connected across leads 140 and 143; the other section 146 is connected across leads 140 and 144. The outputs from the amplifying sections are connected across leads 134 and 135, and 135 and 137, respectively, of cable 136. At the surface of the earth the signals due to chambers 12 and 13 are further amplified by amplifiers 147 and 148 respectively, and the outputs applied to recording milliammeters 149 and 150, by which they are recorded on chart 64. The two records side by side show a zero output except when the respective ionization chamber is exposed during which time the record builds up to a maximum indicative of the ionization in that particular chamber. The difference between the maxima on the two records is the differential ionization.

Occasionally the radioactive content of the formations forming a section of a well is so low that the response of the ionization chambers is substantially zero. In other cases, it is constant over a considerable change in depth. In such cases it is possible to obtain successful radioactivity logs by the employment of a high-energy radiator in the ionization chamber carrier. The energy from this radiator impinging on the walls of the well excites penetrating radiation which can be called secondary radiation to distinguish it from the natural radiation from the formations. This secondary radiation varies from formation to formation and can be logged satisfactorily. The system is used particularly advantageously in this invention. It is necessary to shield each ionization chamber from direct radiation from the high-energy radiator. Since in my invention the difference in the output from the chambers is measured, by placing the radiator symmetrically between the two chambers, the direct effect of the radiator on the chambers tends to balance out, and the shielding need be nowhere near as complete as would be necessary if only one chamber were used.

Such an arrangement is shown in Figure 9, which is a cross section of a portion of the central part of the equipment lowered into the well. Between the two chambers are placed two radiation shields 151 and 152. Between them is placed the high energy radiator 153. Direct radiation from this radiator to each chamber is thereby prevented in large part, but the shielding need not be as complete as if one chamber only were used as described above. Radiation from radiator 153 penetrates the walls of case 11 and impinges on the formations, exciting secondary radiation which affects the two ionization chambers 12 and 13. The rest of the apparatus can be as shown in Figures 1 and 2. The radiator can be any of the known sources of high-energy radiation. Radium-bearing ores such as concentrated pitchblende, carnotite, or the like can be used. Also, mixtures of radium and beryllium can be used surrounded by a thick layer of paraffin, to produce a stream of slow neutrons which upon impingement on the formation of the well excites gamma radiation.

If desired, one chamber can be shielded, for example by suitable shields or by increasing the thickness of the wall 14 or 19, so that one chamber is responsive to the natural radioactivity of the formations and the other is responsive to the secondary radiation. Alternatively, the shields 151 and 152 can be so placed as to limit radiation from the radiator 153 to a region or zone adjacent only one of said chambers. This can be done, for example, by extending shield 152 vertically as shown by the dotted lines defining a region 154, by means of which no radiation from radiator 153 escapes through the walls of case 11 below a horizontal plane passing through radiator 153, thus effectively shielding the formations adjacent chamber 12 from radiation from radiator 153.

It is apparent from the foregoing that there are many possible arrangements of equipment by means of which the differential ionization can be obtained. The fundamental feature of any such equipment is the obtaining of a clean-cut record of the difference between the ionization coming from the formation at the zones of radiation defined by the two ionization chambers, whereby the boundaries of the formation are easily delineated and difficulty from extraneous radiation coming from above or below is eliminated. The invention is not limited to the system shown, but is best defined by the appended claims.

I claim:

1. Apparatus for gamma-ray well logging including a water-tight case adapted to be lowered into said well, two ionization chambers mounted within said case a fixed distance apart, said ionization chambers being shielded from penetrating radiation except that coming from a predetermined narrow region, means mounted within said case for alternately shielding said two ionization chambers from penetrating radiation from said narrow region, and means for amplifying and recording the relative response from said two ionization chambers to said radiation.

2. Apparatus for gamma-ray well logging including a water-tight case adapted to be lowered into said well, two ionization chambers mounted within said case a fixed distance apart, said ionization chambers being shielded from penetrating radiation except that coming from a predetermined narrow region, a moving screen mounted within said case for alternately shielding said two ionization chambers from penetrating radiation from said narrow region, a motor mounted within said case for periodically moving said screen, and means for amplifying and recording the relative response from said two ionization chambers to said radiation.

DANIEL SILVERMAN.